United States Patent Office 3,494,934
Patented Feb. 10, 1970

3,494,934
3-PHENYL-3-TERTIARYAMINO ALKOXY-PHENYL-PROPIOPHENONES
Eugene L. Wittle, Ann Arbor, Mich., assignor to Parke, Davis & Company, Detroit, Mich., a corporation of Michigan
No Drawing. Continuation-in-part of application Ser. No. 528,364, Feb. 18, 1966. This application July 15, 1968, Ser. No. 744,636
Int. Cl. C07d 27/00
U.S. Cl. 260—326.5       6 Claims

ABSTRACT OF THE DISCLOSURE 3-phenyl-3-(p-tertiary aminoalkoxyphenyl)-propiophenone compounds, optionally substituted in the 3-phenyl group by p-chlorine, p-methoxy, or p-di(lower alkyl)-amino, on the 2-carbon atom by lower alkyl, and by p-methoxy; acid-addition salts thereof; and their preparation by (a) reacting a suitably substituted chalcone compound with a p-tertiary aminoalkoxyphenyl magnesium halide and subsequently hydrolyzing the reaction product, or (b) reacting a p-tertiary aminoalkoxy chalcone compound with a suitably substituted phenyl magnesium halide and subsequently hydrolyzing the reaction product. The compounds are useful as pharmacological agents having hypocholesteremic and anti-fertility activity.

CROSS-REFERENCE TO RELATED APPLICATION

This application is a continuation-in-part of co-pending application, Ser. No. 528,364, filed Feb. 18, 1966, now abandoned.

SUMMARY AND DETAILED DESCRIPTION

The present invention relates to new aromatic ketone compounds and to methods for their production. More particularly, the invention relates to new diarylpropiophenone compounds, having the formula,

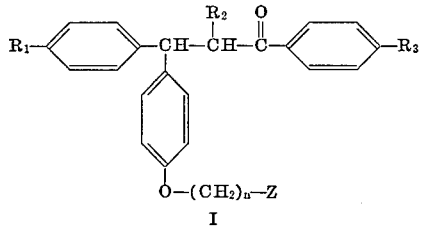

I and to pharmaceutically-acceptable salts thereof; where $R_1$ is hydrogen, chlorine, methoxy, or di(lower alkyl)-amino; $R_2$ is hydrogen or lower alkyl; $R_3$ is hydrogen or methoxy; Z is di(lower alkyl)amino, pyrrolidinyl, piperidino, or morpholino; and $n$ is 2 or 3; with the further proviso that when $R_1$ is hydrogen, $R_3$ is not also hydrogen. The lower alkyl groups appearing in the foregoing formula are those having not more than four carbon atoms.

In accordance with the invention, diarylpropiophenone compounds having the foregoing formula are produced by reacting a chalcone compound, having the formula,

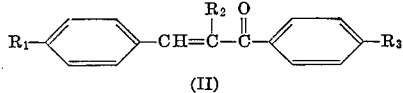

(II)

with a substituted phenyl magnesium halide compound, having the formula,

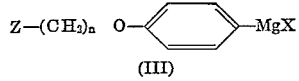

(III)

in an anhydrous, non-reactive solvent medium, followed by hydrolysis of the reaction product by treatment with an aqueous medium; where X is halogen, preferably bromine or iodine, and $R_1$, $R_2$, $R_3$, Z, and $n$ have the same meaning as previously given. Suitable solvents for use in the first stage of the process are ethers, such as tetrahydrofuran, dimethoxyethane, and dioxane, as well as mixtures of these with aromatic hydrocarbons, such as benzene, toluene, and xylene. The highly preferred solvent is tetrahydrofuran. The reaction can successfully be carried out over a wide range of temperatures, from about 20° C. to about 140° C. The preferred temperature is the reflux temperature of the reaction mixture. The duration of the reaction is likewise not critical; at the reflux temperature the reaction is normally complete after a period of 2–6 hours. Equivalent quantities of reactants may be used. To insure complete reaction, however, it is desirable to employ a moderate excess of the substituted phenyl magnesium halide compound. After the first stage of this process is completed, the reaction product is hydrolyzed by treatment with an aqueous medium, such as water, dilute aqueous inorganic acids or bases, and other media containing water. The aqueous medium, which is preferably water alone, is used in several-fold excess. In the isolation of the reaction product from the hydrolyzed reaction mixture, to insure an optimum yield, a preferred procedure involves washing with aqueous inorganic base the solution obtained after removal of the precipitated salts. This washing insures complete conversion of the product to the free amine state, in which state it is more readily separated from other products of the reaction.

The product is obtained as a mixture of stereoisomers that is contaminated with the tertiary alcohol by-product that results from 1,2-addition of the substituted phenyl magnesium halide to the carbonyl group of the chalcone. The desired diarylpropiophenone product is separated from this and other by-products and from unreacted starting materials by fractional crystallization or by means of chromatography on alumina.

In the usual case, the substituted phenyl magnesium halide reagent used as a starting material in the foregoing process is prepared directly in the reaction mixture by reacting the corresponding substituted phenyl halide compound with magnesium in the chosen solvent and is then reacted further without isolation.

The chalcone compounds of Formula II above, that are used as starting materials in the foregoing process, are prepared by reacting a benzaldehyde compound, having the formula,

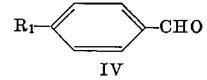

IV with a phenyl alkyl ketone, having the formula,

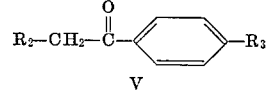

V in the presence of hydrogen chloride; where $R_1$, $R_2$, and $R_3$ have the aforementioned significance.

Further in accordance with the invention, diarylpropiophenone compounds having Formula I above are also produced by reacting a substituted chalcone compound having the formula,

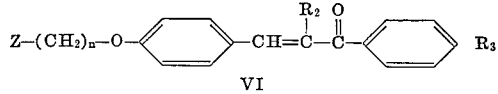

VI with a phenyl magnesium halide compound, having the formula,

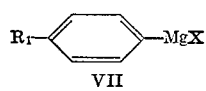

VII in an anhydrous, non-reactive solvent medium, followed by hydrolysis of the reaction product by treatment with an aqueous medium; where $R_1$, $R_2$, $R_3$, Z, n, and X all have the aforementioned significance. The first stage of this process is most conveniently carried out by first preparing the phenyl magnesium halide directly in the reaction mixture (by reacting the corresponding phenyl halide with magnesium in the chosen solvent), then adding a solution of the substituted chalcone in the same solvent, and heating the resulting mixture under reflux for several hours or until reaction is complete. Suitable solvents that may be used are ethers, such as tetrahydrofuran, dimethoxyethane, and dioxane, as well as mixtures of these with aromatic hydrocarbons, such as benzene, toluene, and xylene. The highly preferred solvent is tetrahydrofuran. The temperature and duration of the reaction are not critical and may be varied widely, the temperature from about 20° C. to about 140° C., and the duration from 2 to 6 hours. As stated above, the most convenient and preferred temperature is the reflux temperature of the reaction mixture. At this temperature the reaction is normally complete after several hours. Although equivalent quantities of reactants may be employed, it is preferable to employ a moderate excess of the phenyl magnesium halide compound in order to insure complete reaction. After the first stage of the process is completed, the reaction product is hydrolyzed by treatment with an aqueous medium, such as water, dilute aqueous inorganic acids or bases, and other media containing water. The aqueous medium, which is preferably water alone, is used in several-fold excess. In the isolation of the reaction product from the hydrolyzed reaction mixture, to insure an optimum yield, a preferred procedure involves washing with aqueous inorganic base the solution obtained after removal of the precipitated salts. This washing insures complete conversion of the product to the free amine state, in which state it is more readily separated from other products of the reaction. The product is obtained as a mixture of stereoisomers that is contaminated with the tertiary alcohol by-product that results from 1,2-addition of the phenyl magnesium halide to the carbonyl group of the substituted chalcone. The desired diaryl-propiophenone product is separated from this and other by-products and from unreacted starting materials by fractional crystallization or by means of chromatrography on alumina.

The substituted chalcone compounds having Formula VI above, that are used as staring materials in the foregoing process, are prepared by reacting a substituted benzaldehyde compound, having the formula,

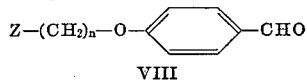

VIII with a phenyl alkyl ketone, having the formula,

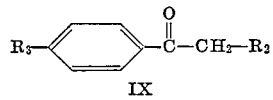

IX in the presence of hydrogen chloride, as described in greated detail hereinafter. In Formulas VIII and IX, $R_2$, $R_3$, Z, and n have the same meaning as previously given. The substituted benzaldehyde compounds of Formula VIII can be prepared by reacting the sodium salt of p-hydroxybenzaldehyde with an aminoalkylhalide compound having the formula $$Z-(CH_2)_n-Hal$$

(X)

where Hal represents a halogen atom and Z and n are as previously defined.

The compounds of the invention can exist in the free base form having Formula I or in the form of one of their acid-addition salts with a variety of inorganic or organic acids. Some representative non-toxic, pharmaceutically-acceptable acid-addition salts are the hydrochloride, hydrobromide, hydroiodide, sulfate, phosphate, acetate, citrate, tartrate, benzoate, benzene-sulfonate, and succinate. When it is desired to employ the compounds of the invention in the form of one of their acid-addition salts, the salt formation is suitably carried out by reacting the selected base with the selected acid in an unreactive solvent. The acid-addition salts can be converted to the free bases by reaction with a base such as sodium hydroxide or potassium hydroxide. The free base compounds and their acid-addition salts are equivalent for purposes of the invention.

The compounds of the invention are new chemical compounds that are useful as pharmacological agents. As such, they are hypocholesteremic agents that are active in producing a fall in the level of blood cholesterol, and they are also anti-fertility agents.

The hypocholesteremic activity of the compounds of the invention is demonstrable and can be quantitatively determined by administering them to standard experimental animals over a period of time and then assaying for plasma cholesterol. In this test, male Holtzman rats, weighing 200–250 g. each, are each given a daily 25 mg./kg. dose of the test compound by oral intubation for seven days. The test groups consist of five to ten rats for each compound, and there are ten controls. During this period, the animals are also given their normal diet of pellets and water, ad lib. At the end of the test period, they are sacrificed and the plasma cholesterol level is determined by standard methods from a blood sample taken from the vena cava. The average cholesterol level found in each test group is compared with that found in the controls, and the activity of a given test compound is expressed in terms of the percentage by which the level in the test animals was lowered.

The results obtained in this test for some representative compounds of the present invention are shown in the following table. In the table, the compounds are identified by reference to the examples that follow, where the preparation of each is described.

HYPOCHOLESTEREMIC ACTIVITY

| Compound: | Cholesterol lowering effect, percent |
|---|---|
| Example 1 | 43 |
| Example 3 (mixture of diastereoisomers) | 50 |
| Example 4(b) | 56 |
| Example 4(c) | 46 |
| Example 4(d) | 54 |
| Example 4(g) (solid) | 49 |
| Example 4(q) | 46 |
| Example 5 (hydrochloride) | 42 |

The anti-fertility activity of the compounds of the invention is determined in a test designed to determine the ability of a test compound to suppress pregnancies in mice. In this test, adult female mice, at least eight weeks old and weighing at least 25 grams, are distributed randomly among 36 cages, four in each cage. The mice are weighed individually and marked for identification as they are divided into groups. Eight of the cages are designated controls, and these mice are fed only the control ration, which is a powdered natural grain diet. The remaining 28 cages are divided into 14 test groups, each having two cages containing a total of eight mice. The test groups receive the same diet as the controls except that the compounds under test are mixed with it in calculated proportions.

After two days of administration of the test compound in the diet, a tested fertile male mouse is introduced into each cage containing four females and left there for 12 days. During this time and to the end of the test, the females continue to receive the test compound in the diet. At the end of the 14-day period, the females are individually weighed and the males are removed from the cages. The females are weighed again at three, three-and-one-half, and four weeks from the start of the test. The test ends at four weeks.

As litters are born, a record is made of the date of birth and the number of young in the litter, and the mother and young are removed from the cage. In order for a test to be valid, there must be a substantial number of litters born in the control cages. The weighing of females at three-and-one-half weeks is important because an increase in weight at this time followed by a decrease in weight at the end of the test but no litter born indicates probable resorption of fetuses. This is confirmed by autopsy.

A test compound at a given dose level is considered active in this test if it prevents completely the birth of liters in either cage of a group of eight mice. The results obtained for representative compounds of the present invention are shown in the following table, where the activity is given in terms of the minimum dose that was found to be active. In this table, too, the compounds are identified by reference to the examples that follow.

ANTI-FERTILITY ACTIVITY

| Compound: | Minimum active dose [1] |
|---|---|
| Example 3 (mixture of diastereoisomers) | 3 |
| Example 4(g) (oil) | 10 |
| Example 4(o) (free base) | 0.5 |
| Example 4(q) | 0.75 |
| Example 4(v) | 10 |
| Example 5 (hydrochloride) | 0.3-0.5 |

[1] Mg./kg. mouse body weight/day.

The preferred compounds of the invention, because of their high degree of anti-fertility activity, are the diarylpropiophenone compounds having the formula,

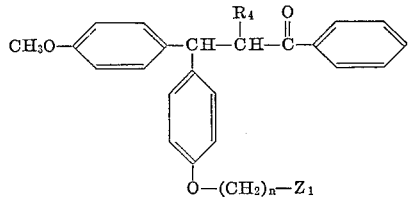

where $R_4$ is ethyl or n-propyl and $Z_1$ is di(lower alkyl)amino or pyrrolidinyl.

As stated earlier, the compounds of the invention are normally obtained as mixtures of stereoisomers. When $R_2$ in Formula I is hydrogen, the compounds are obtained as racemic mixtures. When $R_2$ is lower alkyl, the compounds are obtained as mixtures of diastereoisomers. If desired, these mixtures can be resolved by fractional crystallization and other resolution procedures to give the individual diastereoisomers as well as the optically active components. In some cases, it has been shown that one of the diastereoisomers is the more active of the two. For example, the higher-melting isomer of 2-[α-(p-methoxyphenyl) - p - [2-(1-pyrrolidinyl)ethoxy]benzyl]-butyrophenone has been found to be more active as an anti-fertility agent than the lower-melting isomer. Furthermore, it has been found that these isomers can be interconverted by treating an individual isomer with a strong base, which results in enolization of the carbonyl group and formation of an equilibrium mixture of diastereoisomers, and resolving this mixture into its individual components by fractional crystallization of the free base mixture or by preparation and fractional crystallization of the hydrochloride or other acid-addition salts. In this manner, the less active isomer can be converted to the more active isomer.

The invention is illustrated by the following examples.

EXAMPLE 1

To a slurry of 1 g. of magnesium turnings in 10 ml. of anhydrous tetrahydrofuran is added 1.0 ml. of 1,2-dibromoethane, and then, after the vigorous reaction has subsided, 1.0 ml. of p-[2-(1-pyrrolidinyl)ethoxy]phenyl bromide is added, and the reaction allowed to continue until no more heat is evolved. An additional small amount (1–2 ml.) of p-[2-(1-pyrrolidinyl)ethoxy]phenyl bromide is added and again allowed to react completely. This reaction mixture is then added all at once to a slurry of 5 g. of magnesium turnings in 50 ml. of anhydrous tetrahydrofuran, and the resulting mixture is stirred while a solution of 54 g. of p-[2-(1-pyrrolidinyl)ethoxyl]phenyl bromide in 200 ml. of dry tetrahydrofuran is added at such a rate so as to maintain the temperature of the reaction mixture at about 40–60° C. After addition is complete, the mixture is stirred and heated under reflux for 30–60 minutes to complete the reaction.

To the solution of p-[2-(1-pyrrolidinyl)ethoxy]phenyl magnesium bromide, prepared as described above, is added dropwise a solution of 38 g. of p-anisalacetophenone in 50 ml. of warm tetrahydrofuran, the resulting mixture is stirred and heated under reflux for three hours, and, after standing overnight at room temperature, is treated carefully with 25 ml. of water. The precipitated salts are removed by filtration and washed with 50 ml. of tetrahydrofuran and 50 ml. of methylene chloride. The combined filtrate and washings are evaporated under reduced pressure at 60° C. to remove solvent, and the residue is disolved in 500 ml. of methylene chloride. This solution is filtered, washed with three 100-ml. portions of water, dried, and evaporated to dryness under reduced pressure to give 3-(p-methoxyphenyl)-3-{p-[2-(1-pyrrolidinyl)ethoxy]phenyl}propiophenone; M.P. 116–118° C., following crystallization from ether.

The citrate salt is prepared as follows. A solution of 400 mg. of the free base in 10 ml. of acetone is treated with 200 mg. of citric acid monohydrate, and the solution is heated for a short time on a steam bath, cooled, and diluted with 30 ml. of ether. The resulting oil is isolated, triturated with 20 ml. of ether containing 3–5 ml. of acetone, and the solid citrate salt of 3-(p-methoxyphenyl) - 3 - {p-[2-(1-pyrrolidinyl)ethoxy]phenyl}propiophenone that is obtained is isolated, washed with ether, and dried; M.P. 78–85° C.

EXAMPLE 2

To a stirred solution of p-[2-(1-pyrrolidinyl)-ethoxy]-phenyl magnesium bromide, prepared as in Example 1 above from 27 g. of p-[2-(1-pyrrolidinyl)ethoxy]phenyl bromide and 3 g. of magnesium in 100 ml. of tetrahydrofuran, is added dropwise 19 g. of 2-(p-anisal)propiophenone, and the resulting mixture is stirred and heated under reflux for five hours. After cooling, the mixture is treated carefully with 20 ml. of water, the aqueous mixture is filtered, and the separated solids are washed with 50 ml. of tetrahydrofuran and 50 ml. of methylene chloride. The combined filtrate and washings are evaporated under reduced pressure at 60° C. to remove solvent, and the oily residue is dissolved in 300 ml. of methylene chloride. This solution is filtered, washed well with water, dried and evaporated to dryness. The residue is treated with a mixture of 100 ml. of ether and 100 ml. of petroleum ether, an insoluble oil is separated and discarded, and the solution is concentrated to small volume and allowed to evaporate slowly at room temperature over a period of several days. The crystalline 3-(p-methoxyphenyl) - 2-methyl-3-{p-[2-(1-pyrrolidinyl)ethoxy]phenyl}propiophenone thus obtained has M.P. 118–120° C.

EXAMPLE 3

To a stirred solution of p-[2-(1-pyrrolidinyl)-ethoxy]-phenyl magnesium bromide, prepared as in Example 1 above from 19.5 g. of p-[2-(1-pyrrolidinyl)ethoxy]- phenyl bromide and 2.8 g. of magnesium in 75 ml. of tetrahydrofuran, is added dropwise a solution of 15 g. of 2-(p-anisal)-butyrophenone in 75 ml. of tetrahydrofuran, and the resulting mixture is heated under reflux for five hours, cooled, and treated carefully with 17 ml. of water. The precipitated solids are removed by filtration, washed with 100 ml. of tetrahydrofuran, and the combined filtrate and wash is evaporated under reduced pressure at 60° C. to remove solvent. The residue is treated with 250 ml. of methylene chloride and the mixture is filtered to remove insoluble solid. To the filtrate is added 500 ml. of ether and 150 ml. of 10% aqueous sodium hydroxide, the mixture is thoroughly shaken, and the organic phase is separated, washed with four 200-ml. portions of water, dried, and evaporated under reduced pressure. The oily residue is dissolved in a mixture consisting of 50 ml. of methylene chloride, 100 ml. of diethyl ether, and 100 ml. of petroleum ether, and the solution is poured onto a chromatography column prepared from 60 g. of basic alumina. The column is eluted first with petroleum ether-diethyl ether mixtures, then with diethyl ether, and finally with diethyl ether-methylene chloride mixtures. The desired product, 2 - {α-(p-methoxyphenyl)-p-[2 - (1 - pyrrolidinyl)ethoxy]benzyl}butyrophenone, is obtained upon evaporation of the petroleum ether-diethyl ether eluates; M.P. 91–105° C., mixture of diastereoisomers.

The individual diastereoisomeric free bases are obtained as follows. The mixture of 2 - {α-(p-methoxyphenyl) - p - [2-(1-pyrrolidinyl)ethoxy]benzyl}-butyrophenone diastereoisomers (17 g.) is dissolved in a solvent mixture consisting of 100 ml. of petroleum ether and 100 ml. of diethyl ether, and the solution is poured onto a chromatography column prepared from 200 g. of basic alumina. The column is eluted first with petroleum ether-diethyl ether mixtures, then with diethyl ether, and finally with diethyl ether-methylene chloride mixtures. The diethyl ether eluates are combined and evaporated to dryness to give a low-melting isomer of 2-{α-(p-methoxyphenyl)-p-[2 - (1 - pyrrolidinyl)ethoxy]-benzyl}butyrophenone; M.P. 115–117° C., following several crystallizations from diethyl ether. The solids obtained by evaporation of the diethyl ether-methylene chloride eluates are combined (M.P. 112–124° C.), and the mixture is again subjected to chromatography on a column prepared from 20 g. of basic alumina, with the same elution procedure again followed. From the combined diethyl ether-methylene chloride eluates, by evaporation of the solvent, there is obtained the high-melting isomer; M.P. 128–129° C., following crystallization from diethyl ether.

The low-melting isomer obtained above can be converted to the high-melting isomer as follows. A mixture of 0.6 g. of the low-melting isomer, 1 g. of sodium hydroxide pellets, and 15 ml. of methanol is heated on a steam bath for 4 hours, cooled, diluted with 50 ml. of water and the aqueous mixture is extracted with 250 ml. of diethyl ether. The ethereal extract is washed with water, dried, and evaporated to dryness to give a solid residue that is a mixture of isomers. Most of the high-melting isomer that is present in the mixture can be isolated in pure form by fractional crystallization from diethyl ether-petroleum ether. The remainder of the mixture can be resolved by fractional crystallization of the hydrochloride salts as described in the following procedure.

A solution of 1.0 g. of the mixture of diastereoisomeric 2 - {α-(p-methoxyphenyl)-p-[2-(1-pyrrolidinyl)-ethoxy]-benzyl}butyrophenone free bases in 30 ml. of acetone is treated at room temperature with excess dry hydrogen chloride, the resulting mixture is diluted with an equal volume of ether, and the precipitated salt is isolated (M.P. 160–175° C.) and crystallized from acetone to give the high-melting isomer hydrochloride salt; M.P. 203–206° C. Additional high-melting isomer hydrochloride is obtained by treating the mother liquor from this crystallization with excess base, isolating the mixture of isomeric free bases that is liberated, treating again with hydrogen chloride, and crystallizing the salt from diethyl ether-petroleum ether.

The hydrochloride salt of the high-melting isomer of 2 - {α-(p-methoxyphenyl)-p-[2-(1-pyrrolidinyl)ethoxy]-benzyl}butyrophenone is converted to the high-melting isomer free base by carefully neutralizing an aqueous solution of the hydrochloride salt, extracting with diethyl ether, evaporating the extract to dryness, and crystallizing the solid free base obtained from diethyl ether; M.P. 126–129° C.

EXAMPLE 4

To a stirred solution of p-[2-(1-pyrrolidinyl-ethoxy]-phenyl magnesium bromide, prepared as in Example 1 above from 37 g. of p-[2-(1-pyrrolidinyl)ethoxy]phenyl bromide and 4 g. of magnesium in 100 ml. of tetrahydrofuran, is added dropwise a solution of 30 g. of α-(p-anisal)valerophenone in 150 ml. of tetrahydrofuran, and the resulting mixture is heated under reflux for five hours, cooled, and treated carefully with a solution of 10 g. of ammonium chloride in 100 ml. of water. The precipitated solids are removed by filtration, washed with 100 ml. of methylene chloride, and the solvent is removed from the combined filtrate and washings by evaporation under reduced pressure at 60° C. The residue is dissolved in 500 ml. of methylene chloride, and the solution is washed first with 150 ml. of 10% aqueous sodium hydroxide, then with three 100-ml. portions of water, dried, and evaporated to remove the solvent. The oily residue is dissolved in 50 ml. of methylene chloride, 100 ml. of diethyl ether and 150 ml. of petroleum ether are added, and the solution is poured onto a chromatography column prepared from 500 g. of basic alumina. The column is eluted first with pertloeum ether-diethyl ether mixtures, then with diethyl ether, and finally with diethyl ether-methylene chloride mixtures. The eluates that exhibit carbonyl infrared absorption are combined and again subjected to chromatography on a column prepared from 100 g. of basic alumina.. From the petroleum ether-diethyl ether eluates, after evaporation of the solvent under reduced pressure, there is obtained 2-{α[p-methoxyphenyl] - p - [2 - (1 - pyrrolidinyl)ethoxy]benzyl} valerophenone; M.P. 82–100° C., following crystallization from either.

The hydrochloride salt of 2-{α-[p-methoxyphenyl]-p-[2 - (1-pyrrolidinyl)ethoxy]benzyl}valerophenone is obtained by treating a solution of 0.2 g. of the free base with an excess of dry hydrogen chloride, isolating the precipitated solid and crystallizing it from acetone-ether; M.P. 150–158° C.

By utilizing the general reaction and isolation procedure described in this and previous examples, the following diarylpropiophenone compounds are obtained from the reaction of the designated reactants:

(a) From the reaction of 15 g. of 2-(p-anisal)-hexanophenone and p-[2-(1-pyrrolidinyl)ethoxy]phenyl magnesium bromide (prepared from 17 g. of p-[2-(1-pyrrolidinyl)-ethoxy]phenyl bromide and 1.6 g. of magnesium) there is obtained 2-{α-(p-methoxyphenyl)-p-[2-(1-pyrrolidinyl) - ethoxy]benzyl}hexanophenone; M.P. 65–80° C., following crystallization from ether.

(b) From the reaction of 33 g. of 2-(p-anisal)-p-methoxybutyrophenone and p-[2-(1-pyrrolidinyl)ethoxy]-phenyl magnesium brmoide (prepared from 37.6 g. of p-[2-(1-pyrrolidinyl)ethoxy]phenyl bromide and 4.5 g. of magnesium) there is obtained 2-{α-(p-methoxyphenyl)-p-[2 - (1-pyrrolidinyl)ethoxy]benzyl} - p-methoxybutyrophenone; M.P. 90–103° C.

(c) From the reaction of 15 g. of 2-[(p-dimethylamino)benzal]butyrophenone and p-[2-(1-pyrrolidinyl)-ethoxy]-phenyl magnesium bromide (prepared from 18 g. of p-[2-(1-pyrrolidinyl)ethoxy]phenyl bromide and 1.7 g. of magnesium) there is obtained 2-{α-[(p-dimethylamino)phenyl]-p-[2 - (1-pyrrolidinyl)ethoxy]benzyl}butyrophenone; M.P. 137–138° C., following crystallization from ether.

(d) From the reaction of 15 g. of 2-(p-chlorobenzal)-butyrophenone and p - [2-(1-pyrrolidinyl)ethoxy]phenyl magnesium bromide (prepared from 19 g. of p-[2-(1-pyrrolidinyl)ethoxy]phenyl bromide and 1.7 g. of magnesium) there is obtained 2-{α-(p-chlorophenyl)-p-[2-(1-pyrrolidinyl)-ethoxy]benzyl}butyrophenone; M.P. 126–128° C., following crystallization from diethyl ether-petroleum ether.

(e) From the reaction of 20 g. of [p-(dimethylamino)-benzal]acetophenone and p-[2 - (1-pyrrolidinyl)ethoxy]-phenyl magnesium bromide (prepared from 24 g. of p-[2-(1-pyrrolidinyl)ethoxy]phenyl bromide and 2.6 g. of magnesium) there is obtained 3-[p-(dimethylamino)-phenyl]-3-{p-[2 - (1-pyrrolidinyl)ethoxy]phenyl}propiophenone, isolated as a viscous orange oil.

(f) From the reaction of 14.2 g. of 2-(p-anisal)-3-methylbutyrophenone and p-[2-(1-pyrrolidinyl)ethoxy]-phenyl magnesium bromide (prepared from 16.2 g. of p-[2-(1-pyrrolidinyl)ethoxy]phenyl bromide and 1.7 g. of magnesium) there is obtained 2-{α-(p-methoxyphenyl)-p-[2 - (1-pyrrolidinyl)ethoxy]benzyl} - 3-methylbutyrophenone; M.P. 120–138° C.

(g) From the reaction of 10.7 g. of 2-(p-anisal)-butyrophenone and p-[2-(diethylamino)ethoxy]phenyl magnesium bromide (prepared from 13.6 g. of p-[2-(diethylamino)-ethoxy]phenyl bromide and 2.4 g. of magnesium) there is obtained 2 - {p-[2-(diethylamino)ethoxy]-α-(p-p-methoxyphenyl)benzyl}butyrophenone, isolated as a solid, M.P. 85–88° C., and a colorless oil. The citrate salt, prepared by reacting the oil with citric acid monohydrate in acetone, has M.P. 93–95° C.

(h) From the reaction of 11 g. of 2-(p-anisal)-butyrophenone and p-[3-(1-pyrrolidinyl)propoxy]phenyl magnesium bromide (prepared from 14.2 g. of p-[3-(1-pyrrolidinyl)propoxy]phenyl bromide and 1.7 g. of magnesium) there is obtained 2-{α-(p-methoxyphenyl)-p-[3-(1-pyrrolidinyl)propoxy]benzyl}butyrophenone, isolated as a crystalline solid, M.P. 125–129° C., and a colorless oil. The citrate salt, M.P. 83–87° C., is obtained by reacting the oil with citric acid monohydrate in acetone.

(i) From the reaction of 10.7 g. of 2-(p-anisal)-butyrophenone and p-[3-(1-piperidino)propoxy]phenyl magnesium bromide (prepared from 14.9 g. of p-[3-(1-piperidino)propoxy]phenyl bromide and 2.4 g. of magnesium) there is obtained 2-{α-(p-methoxyphenyl)-p-[3-(1-piperidino)propoxy]benzyl}butyrophenone, isolated as a crystalline solid, M.P. 105–106° C., and a clear, orange oil.

(j) From the reaction of 10 g. of 2-(p-anisal)valerophenone and p-[3-(1-piperidino)propoxy]phenyl magnesium bromide (prepared from 14 g. of p-[3-(1-piperidino)-propoxy]phenyl bromide and 1.5 g. of magnesium) there is obtained 2-{α-(p-methoxyphenyl)-p-]3-(1-piperidino)-propoxy[benzyl}valerophenone, isolated as a crystalline solid, M.P. 105–108° C., and an orange oil.

(k) From the reaction of 10.7 g. of 2-(p-anisal)butyrophenone and p - [2 - (dimethylamino)ethoxy]phenyl magnesium bromide (prepared from 12.2 g. of p-[2-(dimethyl-amino)ethoxy]phenyl bromide and 2.4 g. of magnesium) there is obtained 2 - {p - (dimethylamino)ethoxy] - α - (p - methoxyphenyl)benzyl}butyrophenone, isolated as a crystalline solid, M.P. 86–89° C., and a clear orange oil.

(l) From the reaction of 11.2 g. of 2-(p-anisal)-valerophenone and p - [2 - (dimethylamino)ethoxy]phenyl magnesium bromide (prepared from 12.2 g. of p-[2-(dimethylamino)ethoxy]phenyl bromide and 2.4 g. of magnesium) there is obtained 2 - {p - [2 - (dimethylamino)ethoxy] - α - (p - methoxyphenyl)benzyl}valerophenone, isolated as a crystalline solid, M.P. 84–85° C., and a clear, yellow oil.

(m) From the reaction of 13.9 g. of [p - (diethylamino)benzal]acetophenone and p - [2 - (1-piperidino)ethoxy]phenyl magnesium bromide (prepared from 17 g. of p - [2 - (1 - piperidino)ethoxy]phenyl bromide and 1.7 g. of magnesium) there is obtained 3 - [p - (diethylamino)phenyl] - 3 - {p - [2-(1-piperidino)ethoxy]phenyl}propiophenone.

(n) From the reaction of 13.9 g. of [p - (diethylamino)benzal]acetophenone and p - 2 - (N - morpholino)ethoxy]phenyl magnesium bromide (prepared from 17.2 g. of p - [2 - (N - morpholino)ethoxy]phenyl bromide and 1.7 g. of magnesium) there is obtained 3-[p-diethylamino)phenyl] - 3 - {p - [2-(N-morpholino)ethoxy]phenyl}propiophenone.

(o) From the reaction of 11.2 g. of 2 - (p - anisal) valerophenone and p - [3 - (dimethylamino)propoxy]-phenyl magnesium bromide (prepared from 12.5 g. of p - [3 - (dimethylamino)propoxy]phenyl bromide and 1.2 g. of magnesium) there is obtained 2 - [p-[3-dimethylamino)propoxy] - α - (p - methoxyphenyl)benzyl}valerophenone, M.P. 74–79° C. The hydrochloride salt is obtained by treating a solution of 500 mg. of the free base in acetone-ether with excess dry hydrogen chloride and isolating the solid salt that precipitates; M.P. 156–159° C., following crystallization from acetone-ether.

(p) From the reaction of 25.2 g. of 2 - (p - anisal) valerophenone and p - 3 - (1 - pyrrolidinyl)propoxy]phenyl magnesium bromide (prepared from 32.5 g. of p-[3-(1 - pyrrolidinyl)propoxy]phenyl bromide and 2.7 g. of magnesium) there is obtained 2 - {α - (p-methoxyphenyl) - p - [3 - (1-pyrrolidinyl)propoxy]benzyl}valerophenone, M.P. 98–106° C.

(q) From the reaction of 21.2 g. of 2-benzal-p-methoxybutyrophenone and p - [3 - (dimethylamino)propoxy]phenyl magnesium bromide (prepared from 25.8 g. of p - [3 - (dimethylamino)propoxy]phenyl bromide and 2.4 g. of magnesium) there is obtained 2.93 g. of 2-{p-[3 - (dimethyl-amino)propoxy] - α - phenylbenzyl}-p-methoxybutyrophenone, M.P. 75–83° C.

(r) From the reaction of 22.4 g. of 2 - benzal - p-methoxyvalerophenone and p - [3 - (dimethylamino)propoxy]phenyl magnesium bromide (prepared from 25.8 g. of p - [3 - (dimethylamino)propoxy]phenyl bromide and 2.4 g. of magnesium) there is obtained 2 - {p-[3-(dimethylamino)propoxy] - α - phenylbenzyl} - p-methoxyvalerophenone, M.P. 100–108° C.

(s) From the reaction of 40 g. of 2-benzal-p-methoxybutyrophenone and p - [3 - (1 - pyrrolidinyl)propoxy] phenyl magnesium bromide (prepared from 54 g. of p-[3 - (1 - pyrrolidinyl)propoxy]phenyl bromide and 4.6 g. of magnesium) there is obtained 2 - {α - phenyl-p-[3-(1 - pyrrolidinyl)propoxy]benzyl} - p - methoxybutyrophenone, M.P. 146–148° C., following crystallization from acetone-ether.

(t) From the reaction of 22.4 g. of 2 - benzal-p-methoxyvalerophenone and p - [3 - (1 - pyrrolidinyl)propoxy]phenyl magnesium bromide (prepared from 28.4 g. of p - [3 - (1 - pyrrolidinyl)propoxy]phenyl bromide and 2.4 g. of magnesium) there is obtained 2-{α-phenyl-p - [3 - (1 - pyrrolidinyl)propoxy]benzyl}-p-methoxyvalerophenone, M.P. 122–125° C.

(u) From the reaction of 15 g. of 2 - benzal-p-methoxybutyrophenone and p - [2 - (1 - pyrrolidinyl)ethoxy] phenyl magnesium bromide (prepared from 19.2 g. of p-[2 - (1 - pyrrolidinyl)ethoxy]phenyl bromide and 1.7 g. of magnesium) there is obtained 2 - {α - phenyl-p-[2-(1-pyrrolidinyl)ethoxy]benzyl} - p - methoxybutyrophenone, isolated as a solid, M.P. 115–116° C., and an oil.

(v) From the reaction of 38 g. of 2 - (p - anisal)-p-methoxyvalerophenone and p - [2 - (1 - pyrrolidinyl) ethoxy]-phenyl magnesium bromide (prepared from 44.2 g. of p - [2 - (1 - pyrrolidinyl)ethoxy]phenyl bromide and 5 g. of magnesium) there is obtained 4.19 g. of 2 - {α - (p - methoxyphenyl)-p-[2-(1-pyrrolidinyl)ethoxy]benzyl} - p - methoxy - valerophenone, M.P. 85–105° C.

(w) From the reaction of 11.8 g. of 2 - (p-anisal)-p-methoxybutyrophenone and p - [2 - (dimethylamino)-ethoxy]phenyl magnesium bromide (prepared from 12.2 g. of p - [2 - (dimethylamino)ethoxy]phenyl bromide and 1.2 g. of magnesium) there is obtained 2-{p-[2 - (dimethylamino)ethoxy] - α - (p-methoxyphenyl)benzyl}-p-methoxybutyrophenone, isolated as a pale yellow oil.

(x) From the reaction of 23.7 g. of 2 - (p - anisal)-p - methoxybutyrophenone and p - [2 - (diethylamino)ethoxy]phenyl magnesium bromide (prepared from 27.2 g. of p - [2 - (diethylamino)ethoxy]phenyl bromide and 2.4 g. of magnesium) there is obtained 2-{p-[2-(diethylamino)ethoxy] - α - (p - methoxyphenyl)benzyl}-p-methoxybutyrophenone, isolated as an oil.

EXAMPLE 5

To a stirred solution of p-[3-(dimethylamino)propoxy] phenyl magnesium bromide, prepared as in Example 1 above from 129 g. of p-[3-(dimethylamino)propy]phenyl bromide and 12 g. of magnesium in 500 ml. of tetrahydrofuran, is added dropwise a solution of 106 g. of 2-(p-anisal)butyrophenone in 200 ml. of tetrahydrofuran, and the resulting mixture is heated under reflux for three hours, cooled, and treated carefully first with a mixture of 20 ml. of water and 20 ml. of tetrahydrofuran and then with 150 ml. of methylene chloride. The mixture is next stirred for one hour at room temperature and filtered to remove precipitated solids, which are washed with methylene cholride. The combined washings and filtrate are evaporated under reduced pressure to remove tetrahdrofuran, and the residue is dissolved in a mixture of 200 ml. of methylene chloride and 400 ml. of ether. The solution is washed with 10% aqueous sodium hydroxide and with four 50-ml. portions of water, dried, and evaporated to dryness. The oily residue is dissolved in a minimum amount of ether, and the ethereal solution is set aside to cool. Upon standing, there is obtained from this solution a solid isomer of 2-{p-[3-(dimethylamino)propoxy] α-(p-methoxyphenyl)benzyl}butyrophenone, M.P. 111–113.5° C., following a second crystallization from ether. The ethereal mother liquor that yielded this solid is poured onto a chomatography column prepared from 300 g. of basic alumina, and from the 1:1 petroleum ether-ether eluates there is obtained solid 2-{p-[3-(dimethylamino)propoxy]-α-(p-methoxyphenyl)benzyl}butyrophenone as a mixture of diastereoisomers; M.P. 102–107° C.

The hydrochloride salt is obtained as follows. A solution of 44.5 g. of the solid free base isomer (M.P. 111–113.5° C.) obtained as described above in 400 ml. of warm acetone is filtered and to the filtrate is added a solution of 3.7 g. of hydrogen chloride in 40 ml. of methanol. After thorough mixing, the mixture is evaporated under reduced pressure at 40–60° C. until a white solid precipitates, and is diluted with anhydrous ether. The solid is isolated by filtration, and dried at 70° C. under reduced pressure. It is 2-{p-[3-dimethylamino)propxy]-α-(p-methoxyphenyl)benzyl}butyrophenone hydrochloride, M.P. 177–180° C.

EXAMPLE 6

A solution of 30 g. of p-methoxyphenyl bromide in 75 ml. of anhydrous tetrahydrofuran is slowly added to a stirred mixture of 4 g. of magnesium in 50 ml. of tetrahydrofuran, and the resulting mixture is stirred for one hour. If difficulties are encountered in initiating the reaction, the magnesium can first be activated by adding a small amount of ethylene dibromide. To the resulting mixture, containing p-methoxyphenyl magnesium bromide, is added dropwise a solution of 17 g. of 2-{p-[2-(1-pyrrolidinyl)ethoxy]benzal}butyrophenone in 50 ml. of tetrahydrofuran the mixture is stirred and heated under reflux for three hours, and, after cooling, is treated carefully with 25 ml. of water. The precipitated solids are removed by filtration and washed with 100 ml. of methylene cholride. The combined filtrate and washing is evaporated under reduced pressure at 60° C. to remove solvent. The residue is treated with 100 ml. of methylene chloride, the mixture is filtrated to remove isoluble solid, and to the filtrate is added 200 ml. of diethyl ether and 100 ml. of 10% aqueous sodium hydroxide. The mixture is thoroughly shaken, and the organic phase is separated, washed with three 50-ml. portions of water, dried, and evaporated to dryness. The oily residue obtained is treated with a mixture of 100 ml. of diethyl ether and 100 ml. of petroleum ether, an insoluble oil is separated and discarded, and the solution is poured onto a chrormatography column prepared from 60 g. of neutral alumina. The column is eluted with various petroleum ether-diethyl ether mitxures to give 2-{-α-(p-methoxyphenyl)-p-[2 - (1 - pyrrolidinyl)ethoxy]benzyl} butyrophenone, isolated as a mixture diastereoisomers, M.P. 100–120° C., and as the high-metling isomer, M.P. 122–129° C.

The hydrochloride salt of the mixture of isomers is obtained by treating a solution of 1.0 g. of the free base mixture in 25 ml. of ether containing 3–4 ml. of acetone with excess dry hydrogen chloride, isolating the gummy precipitate, triturating with ether and crystallizing the solid salt that is obtained from acetone-ether; M.P. 175–185° C., mixture of isomeric salts.

The hydrochloride salt of the high-melting isomer can be obtained similarly by reacting the high-melting free base isomer with dry hydrogen chloride; M.P. 203–204° C.

The 2-{p-[2-(1-pyrrolidinyl)ethoxy]benzal}butyrophenone used above as a starting material is prepared as follows. A solution of 100 g. of p-hydroxybenzaldehyde in 300 ml. of N,N-dimethylformamide is added dropwise to a stirred mixture consisting of 20 ml. of ether, 250 ml. of N,N-dimethylformamide, and 40 g. of a 52% sodium hydride suspension in mineral oil. To the resulting solution is added a solution of 130 g. of β-chloroethylpyrrolidine in 600 ml. of ether, and the mixture is distilled to remove ether and stirred and heated at 90–95° C. overnight. After cooling, 1500 ml. of ether and 250 ml. of water are added, and the ether layer is separated, washed successively with 400 ml. of 1 N sodium hydroxide and 400 ml. of saturated aqueous sodium chloride, dried, and evaporated to give p-[2-(1-pyrrolidinyl)ethoxy]benzaldehyde; B.P. 140–150° C./0.3 mm. Hg. A solution of 11 g. of this product and 21 g. of butyrophenone in 10 ml. of methylene chloride is treated with hydrogen chloride at 40° C. until saturated, and after 18 hours at room temperature, the resulting mixture is heated on a steam bath for four hours. The solvent is removed by evaporation under reduced pressure and the residue is treated with a mixture consisting of 50 ml. of benzene, 50 ml. of methylene chloride, 200 ml. of ether, and 100 ml. of water. The aqueous phase is made alkaline with 10% aqueous sodium hydroxide, the mixture is thoroughly shaken, and the organic phase is separated, washed with four 50-ml. portions of water, dried, and evaporated to dryness under reduced pressure to remove unreacted butyrophenone to give 2-{p-[2-(1-pyrrolidinyl)ethoxy]benzal}butyrophenone, isolated as an oil that is suitable for use without purification.

EXAMPLE 7

To a stirred solution of p-methoxyphenyl magnesium bromide, prepared as in Example 5 above from 30 g. of p-methoxyphenyl bromide and 4 g. of magnesium in 125 ml. of tetrahydrofuran, is added dropwise a solution of 20 g. of 2-{p-[2-(diethylamino)ethoxy]benzal}-butyrophenone in 75 ml. of tetrahydrofuran, and the resulting mixture is stirred and heated under reflux for four hours. After cooling, the mixture is treated carefully with a mixture of 30 ml. of tetrahydrofuran and 30 ml. of water, 100 ml. of methylene chloride is added, and the precipitated solids are removed by filtration and washed with 100 ml. of methylene chloride. The combined filtrate and wash is evaporated at 60° C. to remove solvent and the residue is dissolved in 200 ml. of methylene chloride. This solution is washed with 100 ml. of water, dried, concentrated to 100 ml. and diluted with 100 ml. of diethyl ether.

The supernatant solution is decanted and set aside while the insoluble oil is dissolved in 25 ml. of methylene chloride and reprecipitated with 75 ml. of diethyl ether. This second supernatant solution is decanted, combined with the first, and the combined solution is diluted with 150 ml. of petroleum ether. The solution thus obtained is decanted from any insoluble oil and is poured onto a chromatography column prepared from 100 g. of basic alumina. The column is eluted with various diethyl ether-methylene chloride mixtures and all the fractions that exhibit infrared carbonyl absorption are combined and set aside. The insoluble oils that had separated earlier are combined and treated with a mixture of 150 ml. of methylene chloride, 150 ml. of diethyl ether, and 100 ml. of 5% aqueous sodium hydroxide. The organic phase is separated, washed well with water, dried, and evaporated. The residue is dissolved in a small amount of methylene chloride, the solution is poured onto a chromatography column prepared from 50 g. of basic alumina, and the column is eluted with various diethyl ether-methylene chloride mixtures. The fractions exhibiting infrared carbonyl absorption are combined with the fractions set aside earlier, and the combined solution is subjected to chromatography on basic alumina once more. From the petroleum ether-diethyl ether eluates, upon evaporation of the solvent, there is obtained 2-{p-[2-(diethylamino)ethoxy]-α-(p-methoxyphenyl)benzyl}butyrophenone, isolated as an oil that forms crystals upon standing; M.P. 85–88° C.

The citrate salt is obtained as follows. A mixture of 0.10 g. of the crystalline free base, 0.05 g. of citric acid monohydrate, and 15 ml. of acetone is heated on a steam bath until solution is complete, then cooled and diluted with 50 ml. of ether. The liquid is decanted and the precipitate is triturated with 15 ml. of fresh ether to give the citrate salt 2-{p-[2-(diethylamino)ethoxy]-α-(p-methoxyphenyl)benzyl}butyrophenone; M.P. 130–134° C.

The 2-{p-[2-diethylamino)ethoxy]benzal}butyrophenone used above as a starting material is prepared as follows. A mixture of 11 g. of p-[2-(diethylamino)ethoxy]benzaldehyde and 11 g. of butyrophenone is treated with 4.3 g. of hydrogen chloride, the resulting solution is kept at room temperature overnight, and then heated to 65° C. for one hour. After cooling, the mixture is dissolved in 50 ml. of methanol and the solution is made strongly alkaline with 10% aqueous sodium hydroxide. The alkaline mixture is stirred with 300 ml. of ether, 50 ml. of methylene chloride, and 200 ml. of water, and the organic phase is isolated, washed well with water, dried, evaporated and then heated at 100° C./0.2 mm. Hg for 30 minutes to give 2-{p-[2-(diethylamino)ethoxy]benzal}butyrophenone, isolated as an oil that is suitable for use without further purification.

EXAMPLE 8

Utilizing the procedure described in Examples 5 and 6 above, p-methoxyphenyl magnesium bromide and 2-{p-[2-(1-pyrrolidinyl)ethoxy]benzal}valerophenone are reacted to give 2-{α-(p-methoxyphenyl)-p-[2-(1-pyrrolidinyl)ethoxy]benzyl}valerophenone; M.P. 80–90° C., following crystallization from ether.

The 2-{p-[2-(1-pyrrolidinyl)ethoxy]benzal}valerophenone starting material is prepared by reacting p-[2-(1-pyrrolidinyl)ethoxy]benzaldehyde and valerophenone in the presence of hydrogen chloride, according to the procedure described in Examples 5 and 6 for the preparation of related starting materials.

I claim:
1. A member of the class consisting of diarylpropiophenone compounds. having the formula,

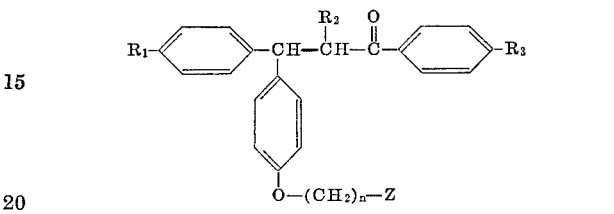

and pharmaceutically-acceptable salts thereof; where $R_1$ is a member of the class consisting of hydrogen, chlorine, methoxy, and di(lower alkyl)amino; $R_2$ is a member of the class consisting of hydrogen and lower alkyl; $R_3$ is a member of the class consisting of hyrogen and methoxy; Z is a member of the class consisting of di(lower alkyl)-amino, 1-pyrrolidinyl, piperidino, and morpholino; and $n$ is a positive integer chosen from between 2 and 3; with the further proviso that when $R_1$ is hydrogen, $R_3$ is not also hydrogen.

2. A compound according to claim 1 which is 2-{α-(p-methoxyphenyl) - p - [2 - (1 - pyrrolidinyl)ethoxy]-benzyl}butyrophenone.

3. A compound according to claim 1 which is 2-{α-[p-methoxyphenyl] - p - [2 - (1 - pyrrolidinyl)ethoxy]-benzyl}valerophenone.

4. A compound according to claim 1 which is 2-{α-(p-methoxyphenyl) - p - [3 - (1 - pyrrolidinyl)propoxy]-benzyl}butyrophenone.

5. A compound according to claim 1 which is 2-{p-[2-(diethylamino)ethoxy] - α - (p - methoxyphenyl)benzyl}-butyrophenone.

6. A compound according to claim 1 which is 2-{p-[3-(dimethylamino)propoxy] - α - (p - methoxyphenyl)-benzyl}butyrophenone.

References Cited

UNITED STATES PATENTS 3,207,788  9/1965  Schumann _____ 260—570

ALEX MAZEL, Primary Examiner

J. TOVAR, Assistant Examiner

U.S. Cl. X.R.

260—247.1, 247.2, 247.5, 247.7, 294.7, 570, 326.3, 294; 424—248, 267, 274, 330